(12) United States Patent
Grünbichler et al.

(10) Patent No.: US 11,189,404 B2
(45) Date of Patent: Nov. 30, 2021

(54) NTC CERAMIC PART, ELECTRONIC COMPONENT FOR INRUSH CURRENT LIMITING, AND METHOD FOR MANUFACTURING AN ELECTRONIC COMPONENT

(71) Applicant: EPCOS AG, Munich (DE)

(72) Inventors: Hermann Grünbichler, St. Josef (AT); Manfred Schweinzger, Schwanberg (AT); Franz Rinner, Deutschlandsberg (AT)

(73) Assignee: EPCOS AG, Munich (DE)

( * ) Notice: Subject to any disclaimer, the term of this patent is extended or adjusted under 35 U.S.C. 154(b) by 481 days.

(21) Appl. No.: 16/063,266

(22) PCT Filed: Dec. 13, 2016

(86) PCT No.: PCT/EP2016/080789
§ 371 (c)(1),
(2) Date: Jun. 16, 2018

(87) PCT Pub. No.: WO2017/102724
PCT Pub. Date: Jun. 22, 2017

(65) Prior Publication Data
US 2018/0301253 A1    Oct. 18, 2018

(30) Foreign Application Priority Data
Dec. 16, 2015    (DE) .......................... 102015121982.4

(51) Int. Cl.
*H01C 7/04*    (2006.01)
*C04B 35/01*    (2006.01)
(Continued)

(52) U.S. Cl.
CPC ........... *H01C 7/046* (2013.01); *C04B 35/016* (2013.01); *C04B 35/62675* (2013.01);
(Continued)

(58) Field of Classification Search
CPC .......... H01C 7/046; H01C 7/045; H01C 7/13; H01C 7/18; H01C 17/281; C04B 35/016;
(Continued)

(56) References Cited

U.S. PATENT DOCUMENTS 3,256,210 A    6/1966    Kruishoop
6,147,587 A *  11/2000   Hadano .................... H01C 7/10
                                                  338/21
(Continued)

FOREIGN PATENT DOCUMENTS

CN    1739173 A    2/2006
CN    201036142 Y  3/2008
(Continued)

OTHER PUBLICATIONS

K. Ghosh, S. B. Ogale, R. Ramesh, R. L. Greene, T. Venkatesan, K. M. Gapchup, Ravi Bathe, and S. I. Patil; "Transition-element doping effects in La0.7Ca0.3MnO3"; Jan. 1, 1999; Phys. Rev. B 59, 533 (Year: 1999).*

(Continued)

*Primary Examiner* — Thienvu V Tran
*Assistant Examiner* — Shahzeb K Ahmad
(74) *Attorney, Agent, or Firm* — Slater Matsil, LLP

(57) ABSTRACT

An NTC ceramic part, an electronic component for inrush current limiting, and a method for manufacturing an electronic component are disclosed. In an embodiment, an NTC ceramic part for use in an electronic component for inrush current limiting is disclosed, wherein the NTC ceramic part has an electrical resistance in the mΩ range at a temperature of 25° C. and/or at room temperature.

20 Claims, 2 Drawing Sheets

(51) Int. Cl.
  *C04B 35/626* (2006.01)
  *H01C 1/14* (2006.01)
  *H01C 7/13* (2006.01)
  *H01C 17/28* (2006.01)

(52) U.S. Cl.
  CPC ..... *C04B 35/62695* (2013.01); *H01C 1/1413* (2013.01); *H01C 7/045* (2013.01); *H01C 7/13* (2013.01); *H01C 17/281* (2013.01); *C04B 2235/3213* (2013.01); *C04B 2235/3227* (2013.01); *C04B 2235/3262* (2013.01); *C04B 2235/5445* (2013.01); *C04B 2235/77* (2013.01)

(58) Field of Classification Search
  CPC ........ C04B 35/62675; C04B 35/62695; C04B 2235/77; C04B 2235/3262; C04B 2235/3213; C04B 2235/3227; C04B 2235/5445; H02H 9/001
  See application file for complete search history.

(56) References Cited

U.S. PATENT DOCUMENTS

| | | | |
|---|---|---|---|
| 6,469,612 B2 | 10/2002 | Nakayama et al. | |
| 7,295,421 B2 | 11/2007 | Mihara et al. | |
| 8,258,915 B2* | 9/2012 | Koto | H01C 7/043 338/22 R |
| 8,466,771 B2 | 6/2013 | Fujita et al. | |
| 9,058,913 B2* | 6/2015 | Feltz | C04B 35/62685 |
| 9,972,426 B2 | 5/2018 | Rinner et al. | |
| 2010/0134237 A1 | 6/2010 | Miura | |
| 2010/0206624 A1* | 8/2010 | Feichtinger | H01G 4/40 174/260 |
| 2012/0200969 A1* | 8/2012 | Hirose | H01C 7/043 361/93.7 |
| 2013/0207770 A1* | 8/2013 | Rinner | H01C 7/041 338/22 R |
| 2013/0229257 A1* | 9/2013 | Hirose | H01C 7/04 338/22 R |
| 2014/0268458 A1* | 9/2014 | Luciani | H02H 3/10 361/86 |
| 2015/0271948 A1* | 9/2015 | Feichtinger | H01L 23/34 361/709 |
| 2016/0155546 A1* | 6/2016 | Miura | H01C 7/041 338/22 R |
| 2018/0130577 A1* | 5/2018 | Toda | H01C 1/1413 |

FOREIGN PATENT DOCUMENTS

| | | | |
|---|---|---|---|
| CN | 101962294 A | | 2/2011 |
| CN | 102211924 A | * | 10/2011 |
| CN | 102211924 A | | 10/2011 |
| CN | 102300829 A | | 12/2011 |
| DE | 1042080 B | | 10/1958 |
| DE | 1181112 B | | 11/1964 |
| DE | 10150248 A1 | | 6/2002 |
| DE | 112004000186 T5 | | 12/2005 |
| DE | 19834423 B4 | | 1/2007 |
| DE | 102014107450 A1 | | 12/2015 |
| GB | 791167 A | | 2/1958 |
| JP | H0737705 A | | 2/1995 |
| JP | 2000216003 A | | 8/2000 |
| JP | 2001143907 A | | 5/2001 |
| JP | 2002008905 A | | 1/2002 |
| JP | 2003042840 A | | 2/2003 |
| JP | 3132750 U | | 6/2007 |
| JP | 2009173484 A | | 8/2009 |
| JP | 2011054974 A | | 3/2011 |
| JP | 2013197127 A | | 9/2013 |
| JP | 6059705 B2 | | 1/2017 |
| KR | 19990071462 A | | 9/1999 |
| KR | 100389274 B1 | | 6/2003 |
| KR | 20040010195 A | | 1/2004 |
| TW | I379819 B | | 7/2009 |

OTHER PUBLICATIONS

Deshmukh, A., et al., "Effect of iron doping on electrical, electronic and magnetic properties of La0.7Sr0.3MnO3," Journal of Physics D: Applied Physics, Institute of Physics Publishing LTD, GB, vol. 42, No. 18, Sep. 4, 2009, pp. 1-5.

Ghosh, K., et al., "Transition-element doping effects in La0.7Ca0.3MnO3," Physical Review, B. Condensed Matter, American Institute of Physics, New York, US, vol. 59, No. 1, Part 01, Jan. 1, 1999, pp. 1-5.

Souza, J., et al., Magnetic susceptibility and electrical resistivity of LaMnO3, CaMnO3, and La1-xSrxMnO3 ($0.13 \leq x \leq 0.45$) in the temperature range 300-900 K, Physical Review B, Jul. 1, 2007, pp. 1-6.

Zhang, H., et al., "Preparation and Characterization of NTC NiMn2O4—La1-xCaxMnO3 ($0 \leq x \leq 0.3$) Composite Ceramics," Advanced Materials Research, vol. 716, Jan. 1, 2013, pp. 78-83.

* cited by examiner

NTC CERAMIC PART, ELECTRONIC COMPONENT FOR INRUSH CURRENT LIMITING, AND METHOD FOR MANUFACTURING AN ELECTRONIC COMPONENT

This patent application is a national phase filing under section 371 of PCT/EP2016/080789, filed Dec. 13, 2016, which claims the priority of German patent application 10 2015 121 982.4, filed Dec. 16, 2015, each of which is incorporated herein by reference in its entirety.

TECHNICAL FIELD

The invention relates to a Negative Temperature Coefficient (NTC) ceramic part, an electronic component for inrush current limiting, and a method for manufacturing an electronic component.

BACKGROUND

Start-stop systems in the automotive sector (automobiles, trucks) represent a major possibility for saving fuel and are therefore built into almost all new vehicles. In these systems, the inrush current of the starter has to be limited in order to prevent a drop in the onboard electrical system voltage, in order that safety-relevant applications (ABS, ESP), in particular, are adequately supplied.

In known start-stop systems, the supply is improved (reinforced battery) and the onboard voltage is stabilized in a complex and expensive manner by means of a DC/DC converter. In this case, the DC/DC converter firstly requires a large amount of space and secondly contains expensive semiconductors (relays or MosFET).

Less expensive and more compact solutions are therefore being sought, for example, through the use of series resistors or SE magnets. However, a greater drop in the onboard voltage occurs in this case.

What is furthermore known is the concept of limiting the voltage drop when an electric motor is started by means of inrush current limiters on the basis of NTC ceramics. However, there are no NTC monolayer elements available which have a resistance in the mohm range at room temperature. Components in which the required electrical conductivity has been realized by reducing the layer thickness and enlarging the cross section by means of a multilayer design have therefore been favored heretofore.

SUMMARY OF THE INVENTION

Embodiments provide an improved NTC ceramic part, an improved electronic component and a method for manufacturing the component.

In accordance with one aspect, an NTC ceramic part is specified. The NTC ceramic part is configured for use in an electronic component, for example, in a multilayer NTC component and/or in a monolithic NTC component. The component is preferably an inrush current limiter (ICL).

The NTC ceramic part has an electrical resistance in the mΩ range at a temperature of 25° C. Alternatively or additionally, the NTC ceramic part has an electrical resistance in the mΩ range at room temperature. Room temperature is understood to mean the temperature that usually prevails in occupied areas. The abovementioned electrical resistance preferably describes the electrical resistance of the non-loaded ceramic part between external contacts at an ambient temperature of 25° C.

By way of example, the NTC ceramic part at the specified temperature has an electrical resistance of less than or equal to 30 mΩ, preferably less than 20 mΩ, for example, 14 mΩ, 15 mΩ, 16 mΩ or 17 mΩ. The NTC ceramic part thus has an extremely low electrical resistance at room temperature or at 25° C. and hence a very high electrical conductivity. The NTC ceramic part is thus particularly well suited to use in an inrush current limiter with high current load.

In accordance with one exemplary embodiment, the NTC ceramic part has the composition $La_{(1-x)}EA_{(x)}Mn_{(1-a-b-c)}Fe_{(a)}Co_{(b)}Ni_{(c)}O_{(3\pm\delta)}$. In this case, $0 \leq x \leq 0.5$ and $0 \leq (a+b+c) \leq 0.5$. EA denotes an alkaline earth metal element. The alkaline earth metal element is preferably selected from magnesium, calcium, strontium or barium. $\delta$ denotes the deviation from the stoichiometric oxygen ratio (oxygen excess or oxygen deficit). Preferably, $|\delta| \leq 0.5$. Particularly preferably, $|\delta| = 0$.

This composition may provide an NTC ceramic part which is distinguished by an extremely high electrical conductivity and a sufficient B-value. By means of (a) thickness and (a) cross section or area of the ceramic part, resistance and current-carrying capacity can be varied further and controlled.

In accordance with one aspect, an electronic component is specified. The electronic component is preferably an inrush current limiter. The component comprises at least one functional layer or active layer. The functional layer comprises the NTC ceramic part described above. Preferably, the functional layer consists of the NTC ceramic part.

On account of the NTC ceramic part, the component may be distinguished by its high electrical conductivity and the sufficient NTC effect (B-value). A simple and cost-effective component for limiting the inrush current is thus provided, which can be operated even at the low voltages and high currents as demanded for this application.

What can be achieved by the low electrical resistance in the mil range is, in particular, that a sufficiently high inrush current of an electrical consumer, which is connected in series with the electronic component, for example, in a corresponding application, is made available, but is limited to an extent such that, for example, the electrical voltage during the switch-on process is still high enough for the electrical supply of further important electrical components. With the aid of the component, the voltage dip during the start process of the consumer is reduced preferably by approximately 1 V in comparison with a consumer without the component.

This can be advantageous or important in the application of the electronic component in the automotive sector, in particular in the case of use as an inrush current limiter for electrical starter motors in motor vehicles ("start-stop systems"). If the inrush current is not sufficiently or appropriately limited, then an onboard electrical system voltage can fall to an extent such that even further safety-relevant applications such as ABS and ESP can no longer be supplied with the intended electrical voltage. In this sense the electronic component contributes directly to safety aspects and/or to energy efficiency in road traffic.

In accordance with one exemplary embodiment, the electrical resistivity of the at least one functional layer in a basic state of the electronic component is between 0.1 Ω·cm and 2.0 Ω·cm. Preferably, the electrical resistivity of the at least one functional layer in a basic state of the electronic component is between 0.1 Ω·cm and 1.0 Ω·cm, for example, 0.3 Ω·cm.

In this case, the basic state describes a temperature of the component of 25° C. and/or at room temperature. The basic state can be a non-loaded state in which, for example, no electrical power is applied to the component.

In accordance with one exemplary embodiment, the component has a thickness of less than or equal to 1.0 mm, for example, 0.5 mm. A compact and small component is thus provided which can find application in a wide variety of installation situations.

In accordance with one exemplary embodiment, the component is a monolithic component. Preferably, the component is configured in sheet form or in laminar fashion. The component can be configured in the form of a substrate. Preferably, the component comprises exactly one functional layer. The functional layer has a thickness of less than or equal to 1.0 mm, for example, 0.3 mm. A metallization is arranged on the functional layer. The metallization preferably comprises silver. As an alternative thereto, the metallization can also comprise copper or gold. Preferably, the component can be contacted via a metallic element, for example, a prong. The prong can be soldered on an exterior of the component, for example. It is thus possible to provide an inrush current limiter in the form of a compact and cost-effective monolithic component (small sheet, lamina, etc.).

In accordance with one exemplary embodiment, the component is a multilayer component. By way of example, the component comprises a multiplicity of functional layers arranged one above another to form a stack, for example, 10, 30 or 50 functional layers. Furthermore, the component comprises a multiplicity of first internal electrodes and second internal electrodes, wherein each of the first and second internal electrodes is arranged between two adjacent functional layers. The first internal electrodes are electrically conductively connected to a first external contact and the second internal electrodes are electrically conductively connected to a second external contact. Preferably, the external contacts comprise silver. However, the external contacts can also comprise copper or gold.

The functional layers are arranged and configured in such a way, in particular the functional layers have such a low resistivity, that both in a basic state and in a hot state of the electronic component, the first and second external contacts are electrically conductively connected to one another via the functional layers.

The hot state may denote a state of the component at a temperature which is greater than that of the electronic component in the basic state. The temperature range between the basic state and the hot state can, for example, span any temperature range between −55° C. and +180° C. or extend across this range. Preferably, the temperature range between the basic state and the hot state can extend across the range of −40° C. to +150° C. Furthermore, the electronic component is an NTC component, that is to say a semiconducting component having a negative temperature coefficient. The hot state of the electronic component in this sense preferably describes a state of the electronic component heated, for example, by an electrical power present. The hot state is preferably furthermore a steady-state temperature state of the component.

As a result of the electrically conductive connection between the first external contact and the second external contact, in particular in the basic state of the electronic component, by comparison with conventional NTC components having an electrical resistance in the Ω or kΩ range in a basic state at 25° C., what can be achieved is that an inrush current of an electrical consumer, which is connected in series with the electronic component, for example, in a corresponding application, is limited to an extent such that the electrical voltage during the switch-on process is still high enough for the electrical supply of further important electrical components.

In accordance with one exemplary embodiment, the component is thermally linked at least to a heat sink. This can contribute to limiting the heating of the component during operation of the component. Preferably, the heating during starting and/or the peak temperature are/is influenced or limited as a result. The functionality and the longevity of the component are thus increased. The heat sink comprises copper, for example. By way of example, the heat sink is a copper plate.

In accordance with one aspect, a method for manufacturing an electronic component is described. Preferably, the component described above is manufactured by the method. All features that have been described in association with the component and/or the NTC ceramic part also apply to the method, and vice versa.

The method may comprise the following steps:

Providing ceramic powder. By way of example, $La_2O_3$, $SrCO_3$ and $Mn_3O_4$ are provided and weighed in stoichiometric amounts. However, other materials for the ceramic powder are also conceivable.

Calcining the ceramic powder. By way of example, the powder is heated to 900° C. for six hours in a calcining process. In this case, the $CO_2$ can escape and the individual raw materials react to form the desired chemical compound.

Admixing the ceramic powder with water in order to produce a granulated material. Admixing with water and subsequent grinding serve to obtain a sufficient sintering activity. After the water has been evaporated, a binder is preferably added in order to produce the granulated material.

Pressing the granulated material. By way of example, cylindrical components are produced by dry pressing in this step.

Burning out the binder (decarburizing). The binder is preferably burned out at 400 to 500° C.

Sintering the granulated material. In this step, the granulated material or the components pressed from the granulated material is or are sintered, for example, at 1250° C.

Contacting the sintered body with a silver paste.

A compact and cost-effective component which can be used for limiting the inrush current may be manufactured by means of the method. By virtue of the very high electrical conductivity of the functional layer of the component (NTC ceramic part), the inrush current limiter can be embodied as a cost-effective, monolithic component (small sheet, lamina, etc.).

In accordance with a further aspect, a method for manufacturing an electronic component is described. Preferably, the component described above is manufactured by the method. All features that have been described in association with the component and/or the NTC ceramic part also apply to the method, and vice versa.

The method comprises the following steps:

Providing green sheets for forming functional layers. The green sheets preferably comprise the above-described material of the NTC ceramic part. In particular, the green sheets are sheets for an NTC ceramic part or NTC ceramic layer to be produced. The green sheets are preferably layers of a raw material which, for example, is not sintered.

Providing the green sheets with internal electrodes. The green sheets are preferably each printed with at least one internal electrode or internal electrode layer. The internal electrodes can be printed onto the green sheets, for example, by screen printing.

Stacking the green sheets provided with the internal electrodes to form a stack. The stacking is preferably carried out in such a way that the internal electrodes are each arranged between two adjacent green sheets.

Pressing the stack. The stack is preferably pressed to form a block. The method furthermore comprises, for example, separating the block into partial blocks. Preferably, the block is cut in order to separate the block.

In one preferred configuration, the stack or the pressed block is subsequently subjected to thermal treatment. The thermal treatment comprises, for example, decarburizing the stack or the block. In one preferred configuration, the stack or the block is sintered during the thermal treatment. The sintering is expediently carried out after the decarburizing.

Providing the stack or the block with external contacts. The external contacts preferably comprise silver, copper or gold.

A component which can be used for limiting the inrush current may be manufactured by means of the method. By virtue of the very high electrical conductivity of the functional layers of the component (NTC ceramic part), a particularly efficient inrush current limiter can be provided.

In accordance with a further aspect, a system comprising at least one electronic component is described. The component preferably corresponds to the component described above. All features that have been described in association with the component also apply to the system, and vice versa.

The system can also comprise more than one component, for example, three electronic components. The plurality of components or the majority of the components are connected in parallel with one another. The system furthermore comprises a consumer device, which is electrically connected in series with the electronic component and together with the electronic component is exposed to an ambient temperature. The system can correspondingly furthermore comprise an electrical power source configured to provide the inrush current mentioned.

The system may be configured in such a way that a heating time, that is to say the time in which an inrush current of the consumer device heats the electronic component to a steady-state temperature, is coordinated with an electrical start-up time of the consumer device. The electrical start-up time determines when the inrush current has fallen to the rated current of the consumer device.

The steady-state temperature preferably represents the temperature of the abovementioned hot state of the electronic component. Furthermore, the steady-state temperature preferably alternatively or additionally describes an equilibrium temperature and/or an operating temperature of the system. The steady-state temperature is preferably 120° C.

By coordinating the heating time with the start-up time, or vice versa, it is possible, for example, in contrast to the situation in which the heating time is dimensioned to be too short in comparison with the electrical start-up time, to prevent damage to further components that interact electrically with the system or the consumer device. Furthermore, by means of the coordination mentioned, for example, in contrast to the situation in which the heating time is dimensioned to be too long in comparison with the electrical start-up time, it is possible to achieve proper reliable operation of the consumer device, for example, in cooperation with the abovementioned further components that interact with the system or the consumer device. The further components mentioned may denote, as indicated above, electrical components of the onboard electrical system of a motor vehicle, such as the ABS or ESP system.

The heating time is preferably or expediently equal to or slightly shorter than the start-up time. Overall, the electronic component and/or the system are/is preferably configured in such a way that the heating time and the start-up time are at least largely identical.

BRIEF DESCRIPTION OF THE DRAWINGS

The invention is explained in greater detail below on the basis of exemplary embodiments and with reference to the associated figures.

The drawings described below should not be interpreted as true to scale. Rather, for the sake of better illustration, individual dimensions may be illustrated in an enlarged, reduced or even distorted manner.

Elements which are identical to one another or which perform the same function are designated by identical reference signs.

Figure 1:
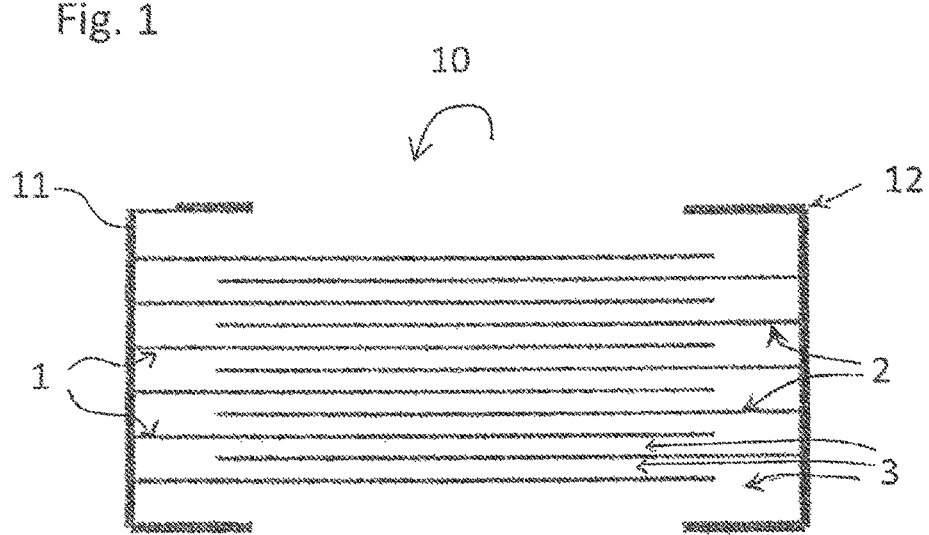
Figure 2:
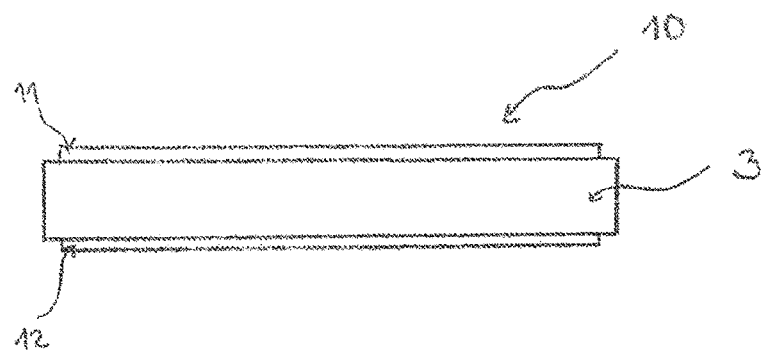
Figure 3:
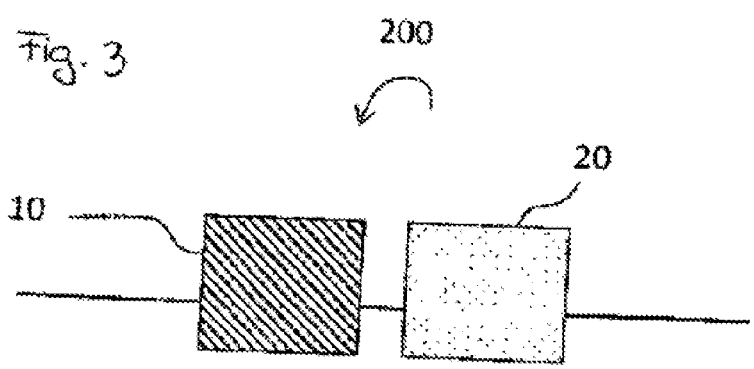
Figure 4:
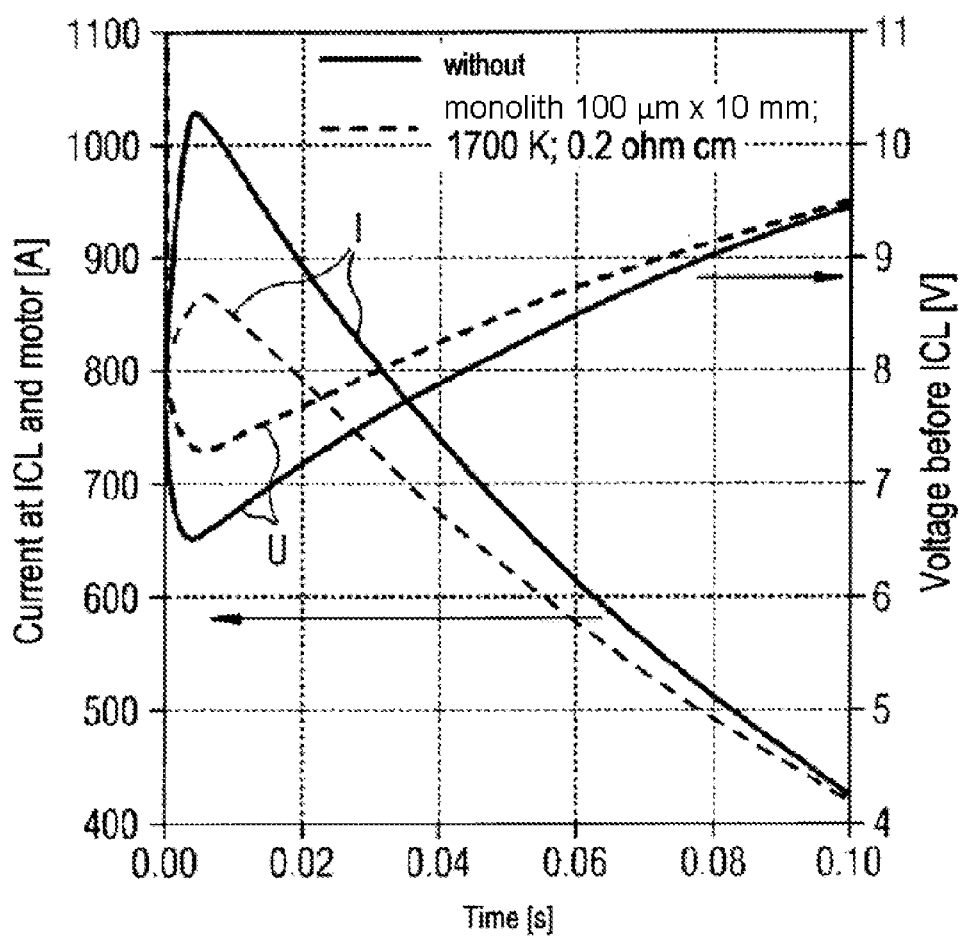

FIG. 1 shows a schematic sectional view of an electronic component;

FIG. 2 shows a schematic side view of an electronic component in accordance with a further embodiment;

FIG. 3 shows a schematic view of a system comprising a component in accordance with FIG. 1 or 2 and a consumer device; and FIG. 4 shows the switch-on behavior of a consumer device with and without interconnection of the electronic component.

DETAILED DESCRIPTION OF ILLUSTRATIVE EMBODIMENTS

FIG. 1 shows a schematic sectional view of an electronic component 10. The electronic component 10 is preferably an NTC component. The electronic component 10 preferably finds application as an inrush current limiter, in particular for electrical starter motors in "start-stop systems" for motor vehicles.

In this exemplary embodiment, the component 10 is a multilayer component. The component 10 comprises a multiplicity of first internal electrodes 1. The component 10 comprises a multiplicity of second internal electrodes 2. The first and second internal electrodes 1, 2 are arranged alternately one above another. The first and second internal electrodes 1, 2 are preferably configured such that they are of identical type. Furthermore, the first internal electrodes 1, as considered in a plan view of the component 10, overlap the second internal electrodes 2, for example, in order to form an electrically active region, the overlap region.

The component 10 furthermore comprises a first external contact 11. The first external contact 11 is arranged at a first side surface of the electronic component 10. The first internal electrodes 1 are electrically conductively connected to the first external contact 11. Preferably, the first external contact 11 comprises silver.

The electronic component 10 furthermore comprises a second external contact 12. The second external contact 12 is arranged at a second side surface of the electronic component 10. The second side surface is situated opposite the first side surface. The second internal electrodes 2 are electrically conductively connected to the second external contact 12. Preferably, the second external contact 12 comprises silver.

The electronic component 10 comprises a multiplicity of functional layers or active layers 3. The functional layers 3 are arranged one above another to form a stack. The internal electrodes 1, 2 and the functional layers 3 are arranged in particular in an alternating fashion or alternately to form a stack. Each of the first and second internal electrodes 1, 2 is arranged between two adjacent functional layers 3.

The respective functional layer 3 comprises a ceramic material. In particular, the functional layer 3 comprises an NTC ceramic part. The respective functional layer 3 consists of the NTC ceramic part. The NTC ceramic part has the following composition:

$$La_{(1-x)}EA_{(x)}Mn_{(1-a-b-c)}Fe_{(a)}Co_{(b)}Ni_{(c)}O_{(3\pm\delta)}.$$

In this case, $0 \leq x \leq 0.5$ and $0 \leq (a+b+c) \leq 0.5$. EA stands for an alkaline earth metal element, for example, Mg, Ca, Sr or Ba. $\delta$ denotes the deviation from the stoichiometric oxygen ratio (oxygen excess or oxygen deficit). Preferably, $|\delta| \leq 0.5$; particularly preferably, $|\delta|=0$. By way of example, the NTC ceramic part has the composition $La_{0.95}Sr_{0.05}MnO_3$.

The functional layers 3 are preferably configured such that they are of identical type or similar. The respective functional layer 3 has a thickness or vertical extent (referred to hereinafter as "layer thickness"). The layer thickness of the functional layers 3 is preferably between 10 μm and 100 μm or between 10 μm and 50 μm, for example, 40 μm. The layer thickness 3 of the respective functional layer 3 is chosen such that the respective functional layer 3 has a predetermined or specific resistance. In particular, by means of the thickness of the functional layer 3, a resistance and a current-carrying capacity of the functional layer 3 can be varied and controlled.

The respective functional layer 3 has a specific area or a specific cross section (referred to hereinafter as "horizontal extent"). The horizontal extent is defined by a width and a length of the functional layer 3. The width is preferably 4.0 to 5.0 mm, for example, 4.8 mm. The length is preferably 5.0 mm to 6.0 mm, for example, 5.6 mm.

The horizontal extent of the respective functional layer 3 is chosen such that the respective functional layer 3 has a predetermined or specific resistance. In particular, by means of the horizontal extent of the functional layer 3, the resistance and the current-carrying capacity of the functional layer 3 can be varied and controlled. Preferably, the electrical resistance of the respective functional layer 3 at a temperature of 25° C. is in the mΩ range, for example, 15 mΩ or 20 mΩ. In other words, the functional layer 3 preferably has a very low electrical resistance and thus a very high electrical conductivity at a temperature of 25° C.

By choosing a specific horizontal and/or vertical extent of the respective functional layer 3, it is possible to increase the current-loading capacity and/or current-carrying capacity of the electronic component up to current intensities of a few 100 A, for example, by comparison with conventional NTC components.

The functional layers 3 are preferably configured such that both in a basic state and in a hot state (operating state) of the electronic component 10, the first and second external contacts 11, 12 of the electronic component 10 are electrically conductively connected to one another via the functional layers 3.

The electrical resistivity of the respective functional layer 3 in the basic state of the electronic component 10, for example, at a temperature of 25° C., is preferably between 0.1 Ω·cm and 0.2 Ω·cm, for example, 0.145 Ω·cm (in this respect, also see table 1).

The B-value (thermistor constant) of the functional layers 3 is preferably less than 3000 K and more than 1500 K, for example, 1650 to 1750 K, preferably 1700 K (in this respect, also see table 1).

The abovementioned basic state preferably describes a temperature of the electronic component 10 of 25° C. and/or at room temperature. The hot state preferably describes a temperature of the electronic component 10 which is greater than the temperature of the electronic component 10 in the basic state. The hot state is preferably an operating state in which the electronic component 10 has assumed an operating temperature. The operating temperature can represent a steady-state temperature, for example, of the loaded component 10. By contrast, the basic state preferably describes a non-loaded state of the component 10.

The temperature range between the basic state and the hot state can extend, for example, across the temperature range of between −55° C. and +180° C. Particularly preferably, the temperature range between the basic state and the hot state extends across the range of −40° C. to +150° C.

In order to limit the heating of the component 10 during the operation thereof, the component 10 can be thermally linked to a heat sink. The heat sink can comprise a Cu plate, for example. The heating during starting and the peak temperature can be influenced or limited with the aid of the heat sink.

In contrast to the illustration in FIG. 1, in one particularly preferred exemplary embodiment the electronic component 10 can be embodied in the form of a small sheet or a substrate (FIG. 2). In particular, the component 10 in this exemplary embodiment is a monolithic component.

In this exemplary embodiment, the component 10 comprises only one functional layer or active layer 3. The functional layer 3 comprises an outer metallization, for example, in the form of a first and a second external contact 11, 12. The external contacts 11, 12 are arranged, for example, at the opposite side surfaces of the functional layer 3. As an alternative thereto, however, the external contacts 11, 12 can also be arranged at a top side and an underside of the functional layer 3, as is illustrated in FIG. 2. The external contacts 11, 12 preferably comprise silver. The component 10 is electrically contacted, for example, by means of a soldered conductive prong (not explicitly illustrated).

In this exemplary embodiment, the functional layer 3 has, for example, a diameter of less than 15 mm, for example, 10 mm. The functional layer 3 preferably has a thickness of less than 0.5 mm, for example, 0.1 mm, particularly preferably 0.3 mm. As already described in association with FIG. 1, by means of the thickness of the functional layer 3, the resistance and the current-carrying capacity of the functional layer 3 are varied and controlled.

The component 10 in accordance with FIG. 2 has a small thickness or vertical extent compared with the component 10 described in association with FIG. 1. The finished component 10 with metallization and contacting has, for example, a thickness of less than or equal to 0.5 mm.

As already explained in association with FIG. 1, the electrical resistivity of the functional layer 3 in the basic state of the electronic component 10 is preferably between 0.1 Ω·cm and 0.2 Ω·cm, for example, 0.145 Ω·cm (in this respect, also see table 1). Hence the functional layer 3 at room temperature or at 25° C. has a very low resistance and consequently a very high electrical conductivity. Hence a simple and cost-effective component 10 for limiting the inrush current is realized, which can be operated even at the low voltages and high currents as is demanded for this application.

The current-loading capacity and/or current-carrying capacity of the component 10 can be augmented still further by a parallel connection of a plurality of components 10 in accordance with FIG. 2. By way of example, three components 10 can be connected in parallel in order to further increase the current-carrying capacity and decrease the electrical resistance.

All further features of the component 10 in accordance with FIG. 2, in particular the functioning thereof and the construction of the functional layer 3 (NTC ceramic part), correspond to the features described in association with FIG. 1.

The component 10 in accordance with FIG. 2 is manufactured, for example, as follows. In this case, a component 10 comprising a functional layer 3 comprising an NTC ceramic part of the composition $La_{0.95}Sr_{0.05}MnO_3$ is described by way of example. It goes without saying that other compositions of the NTC ceramic part in accordance with the formula indicated above are also possible in this context.

The component 10 is manufactured according to the so-called "mixed oxide method". In this case, firstly $La_2O_3$, $SrCO_3$ and $Mn_3O_4$ are weighed in stoichiometric amounts and subjected to wet grinding. The grinding is carried out on a planetary ball mill using grinding beads composed of $ZrO_2$. The grinding progress is observed by monitoring of the grain size distribution and ended when d(90%)<1.5 μm.

The suspension is subsequently dried and sieved. The powder obtained is heated to 900° C. for 6 hours in a calcining process. In this case, the $CO_2$ formed can escape and the individual raw materials react to form the desired chemical compound. The completeness of the conversion is checked and confirmed by means of XRD analysis.

In order to obtain a sufficient sintering activity, the powder is further mixed with water and ground until a mean grain size of 0.5 μm is achieved. After evaporation of the water, the powder is admixed with a suitable binder, such that a granulated material suitable for dry pressing is produced. Cylindrical components are then produced on a tablet press and subsequently fired at 1250° C. in a laboratory furnace.

The compactly sintered components are then ground to size and contacted with a silver paste. The resistance of the finished components is measured in the temperature range of −30° C. to +180° C.

The result values of three components 10 manufactured according to the above manufacturing method are presented in table 1. Table 1 shows, in particular, the sintered density, the resistivity at 25° C. and also the B-value of the respective component 10.

TABLE 1

Result values of three components in accordance with the manufacturing method described above

| Component | Sintered density (g/cm³) | Resistivity at 25° C. (ohm * cm) | B-value 25° C./100° C. (K) |
|---|---|---|---|
| 1 | 6.39 | 0.147 | 1698 |
| 2 | 6.39 | 0.146 | 1706 |
| 3 | 6.40 | 0.145 | 1701 |
| Mean value | 6.39 | 0.146 | 1702 |
| Variance | 0.01 | 0.001 | 4 |

Table 2 below shows other embodiments of the ceramic composition. In this case, various ceramic compositions were tested under similar manufacturing conditions.

TABLE 2

Results of various formulations from the range of composition of the NTC ceramic part

| X | | a | b | c | a + b + c | Resistivity at 25° C. (ohm*cm) | B-value 25° C./100° C. (K) |
|---|---|---|---|---|---|---|---|
| 0 | | 0 | 0 | 0 | 0 | 0.18 | 1731 |
| 0.1 | (Sr) | 0 | 0 | 0 | 0 | 0.09 | 1539 |
| 0 | | 0 | 0.1 | 0 | 0.1 | 0.40 | 1586 |
| 0 | | 0 | 0.2 | 0 | 0.2 | 1.01 | 1686 |
| 0.05 | (Sr) | 0 | 0.1 | 0 | 0.1 | 0.35 | 1540 |
| 0.05 | (Sr) | 0 | 0.2 | 0 | 0.2 | 0.62 | 1626 |
| 0.01 | (Sr) | 0 | 0 | 0 | 0 | 6.08 | 2486 |
| 0.01 | (Sr) | 0.1 | 0 | 0 | 0.1 | 1.47 | 1907 |
| 0.01 | (Sr) | 0.2 | 0 | 0 | 0.2 | 2.78 | 1901 |
| 0.1 | (Sr) | 0.1 | 0 | 0 | 0.1 | 0.41 | 1687 |
| 0.1 | (Sr) | 0.2 | 0 | 0 | 0.2 | 0.77 | 1665 |
| 0.01 | (Sr) | 0 | 0.3 | 0 | 0.3 | 3.21 | 1902 |
| 0.01 | (Sr) | 0 | 0.4 | 0 | 0.4 | 11.05 | 2081 |
| 0.1 | (Sr) | 0.2 | 0.3 | 0 | 0.5 | 17.29 | 2464 |
| 0.1 | (Mg) | 0 | 0 | 0 | 0 | 0.57 | 1649 |
| 0.1 | (Ca) | 0 | 0 | 0 | 0 | 0.23 | 1678 |
| 0.1 | (Ba) | 0 | 0 | 0 | 0 | 0.23 | 1772 |
| 0.1 | (Sr) | 0 | 0 | 0.1 | 0.1 | 0.20 | 1466 |
| 0.1 | (Sr) | 0 | 0 | 0.2 | 0.2 | 0.39 | 1644 |

FIG. 3 shows a schematic illustration of a system 200, in which the electronic component 10 is interconnected and/or arranged in series with an electrical consumer device 20.

In the system 200—given a common ambient temperature of the electronic component 10 and the consumer device 20—the heating time, that is to say the time in which the inrush current of the consumer device 20 heats or has heated the electronic component 10 to a steady-state temperature—is preferably coordinated with the electrical start-up time of the consumer device 20. The electrical start-up time determines when the inrush current of the consumer device 20 has fallen to the rated current thereof. By way of example, the start-up time is approximately 50 ms. The steady-state temperature can describe, for example, a state in which the electrical power fed to the component 10 is dissipated to the surroundings via thermal conduction and/or thermal radiation in such a way that the temperature of the component 10 does not increase further.

In one exemplary configuration of the system 200, the heating time and the electrical start-up time are identical. In a further exemplary configuration of the system 200, the heating time and the electrical start-up time are in a ratio of between 0.5 and 1.5 to one another.

The abovementioned tuning makes it possible to optimize in particular the operation of the system 200, for example, as inrush current limiting in motor vehicles.

The system 200 can correspondingly furthermore comprise an electrical power source (not explicitly illustrated in the figures) that is expediently configured to provide the inrush current mentioned.

FIG. 4 shows the electrical switch-on behavior of the consumer device 20 with and without inrush current limiting. The consumer device 20 is preferably an electrical starter motor of a motor vehicle. In this case, by way of example, the component 10 from FIG. 2 is connected in series with the consumer device 20. The component 10 is thus by way of example a component 10 embodied as a small sheet and comprising a functional layer 3 composed of the NTC ceramic part described above. In this case, the functional layer 3 has a diameter of 10 mm and a thickness of 0.1 mm. It goes without saying that other diameters and thicknesses or a different construction of the component 10, for example, a construction in accordance with FIG. 1, are also conceivable.

In FIG. 4, the electric current (I) is plotted against time (see left-hand ordinate axis). In this case, a time of 0 seconds corresponds instantaneously to the switch-on process. Furthermore, the electrical voltage (U) across the electronic component 10 is plotted on the right-hand ordinate axis.

The dashed lines respectively describe the current and voltage profiles with the series-connected component 10 as an inrush current limiter, whereas the solid lines correspondingly represent the current and voltage profiles of the consumer device 20 without the component 10, that is to say without inrush current limiting.

It is evident that the inrush current I shortly after the switch-on process, that is to say, for example, in the first to ms after the switch-on process, is significantly higher compared with the case of the series-connected component 10 as inrush current limiting.

Accordingly, the voltage drop shortly after the switch-on process, for example, within the first 40 ms, is also greater without inrush current limiting than with inrush current limiting. In particular, the voltage U without inrush current limiting shortly after the switch-on process drops from 12 V to approximately 6.5 V. With the aid of the component 10, the voltage dip during the start process is reduced by approximately 1 V in comparison with a consumer device 20 without a component 10. With a component 10, the voltage U shortly after the switch-on process drops in particular from 12 V to approximately 7.4 V.

The invention is not restricted by the description on the basis of the exemplary embodiments. Rather, the invention encompasses any novel feature and also any combination of features, which in particular includes any combination of features in the patent claims, even if this feature or this combination itself is not explicitly indicated in the patent claims or exemplary embodiments.

The invention claimed is:

1. A Negative Temperature Coefficient (NTC) ceramic part for use in an electronic component for inrush current limiting, the NTC ceramic part comprising:

$La_{(1-x)}EA_{(x)}Mn_{(1-a-b-c)}Fe_{(a)}Co_{(b)}Ni_{(c)}O_{(3\pm\delta)}$, wherein $0 \leq x \leq 0.5$ and $0 \leq (a+b+c) \leq 0.5$, wherein La denotes lanthanum, Mn denotes manganese, Fe denotes iron, Co denotes cobalt, Ni denotes nickel, and O denotes oxygen, wherein EA denotes an alkaline earth metal element, which is selected from the group consisting of magnesium, strontium and barium, wherein $\delta$ denotes a deviation from a stoichiometric oxygen ratio, and wherein the NTC ceramic part has an electrical resistance of 30 m$\Omega$ or smaller at a temperature of 25° C.

2. The NTC ceramic part according to claim 1, wherein $|\delta| \leq 0.5$.

3. An electronic component comprising:

at least one functional layer, wherein the functional layer comprises a Negative Temperature Coefficient (NTC) ceramic part configured to limit inrush current, wherein the NTC ceramic part comprises $La_{(1-x)}EA_{(x)}Mn_{(1-a-b-c)}Fe_{(a)}Co_{(b)}Ni_{(c)}O_{(3\pm\delta)}$, wherein $0 \leq x \leq 0.5$ and $0 \leq (a+b+c) \leq 0.5$, wherein La denotes lanthanum, Mn denotes manganese, Fe denotes iron, Co denotes cobalt, Ni denotes nickel, and O denotes oxygen, wherein EA denotes an alkaline earth metal element, which is selected from the group consisting of magnesium, strontium, and barium, wherein $\delta$ denotes a deviation from a stoichiometric oxygen ratio, and wherein the NTC ceramic part has an electrical resistance of 30 m$\Omega$ or smaller at a temperature of 25° C.

4. The electronic component according to claim 3, wherein an electrical resistivity at a temperature of 25° C. of the at least one functional layer is between 0.1 $\Omega$·cm and 2.0 $\Omega$·cm.

5. The electronic component according to claim 3, wherein the electronic component has a thickness of less than or equal to 1.0 mm.

6. The electronic component according to claim 3, wherein the electronic component is a monolithic component.

7. The electronic component according to claim 6, wherein the electronic component comprises exactly one functional layer, wherein the functional layer has a thickness of less than or equal to 1.0 mm, and wherein a metallization is arranged on the functional layer.

8. The electronic component according to claim 7, wherein the metallization comprises silver, copper or gold.

9. The electronic component according to claim 3, wherein the electronic component is a multilayer component.

10. The electronic component according to claim 9, wherein the electronic component comprises a plurality of functional layers, first internal electrodes and second internal electrodes arranged one above another to form a stack, wherein each of the first and second internal electrodes is arranged between two adjacent functional layers, wherein the first internal electrodes are electrically conductively connected to a first external contact and the second internal electrodes are electrically conductively connected to a second external contact, and wherein the functional layers are arranged and configured such that both, the first and second external contacts, in a basic state and in a hot state of the electronic component, are electrically conductively connected to one another via the functional layers.

11. The electronic component according to claim 3, wherein the electronic component is thermally linked at least to a heat sink in order to limit heating of the electronic component during operation of the electronic component, and wherein the heat sink comprises copper.

12. The electronic component according to claim 3, wherein $|\delta| \leq 0.5$.

13. A method for manufacturing the electronic component according to claim 3, the method comprising:

providing a ceramic powder;

calcining the ceramic powder;

admixing the ceramic powder with water and a binder in order to produce a granulated material;

pressing the granulated material;

sintering the granulated material; and contacting the sintered material with a silver paste.

14. A method for manufacturing the electronic component according to claim 3, the method comprising:

providing green sheets;

printing the green sheets with internal electrodes;

stacking the green sheets comprising the internal electrodes to form a stack;

sintering the stack; and forming external contacts at the stack.

15. A system comprising:
at least one electronic component according to claim 3; and
a consumer device electrically connected in series with the electronic component,
wherein both, the electronic component and the consumer device, are exposed to an ambient temperature, and
wherein the system is configured such that a heating time is coordinated with an electrical start-up time of the consumer device, which determines when an inrush current has fallen to a rated current of the consumer device.

16. The system according to claim 15, wherein the system comprises three electronic components, and wherein the electronic components are connected in parallel with one another.

17. An electronic component comprising:
a plurality of functional layers; and
first internal electrodes and second internal electrodes arranged one above another to form a stack,
wherein each of the first and second internal electrodes is arranged between two adjacent functional layers,
wherein the first internal electrodes are electrically conductively connected to a first external contact and the second internal electrodes are electrically conductively connected to a second external contact,
wherein the functional layers are arranged such that both, the first and second external contacts, in a basic state and in a hot state of the electronic component, are electrically conductively connected to one another via the functional layers,
wherein the functional layer comprises a Negative Temperature Coefficient (NTC) ceramic part configured to inrush current limiting, and
wherein the NTC ceramic part has an electrical resistance of 30 mΩ or smaller at a temperature of 25° C.

18. The electronic component according to claim 17, wherein an electrical resistivity at a temperature of 25° C. of the functional layers is between 0.1 Ω·cm and 2.0 Ω·cm.

19. The electronic component according to claim 17, wherein the electronic component has a thickness of less than or equal to 1.0 mm.

20. The electronic component according to claim 17, wherein the electronic component is thermally linked at least to a heat sink in order to limit heating of the electronic component during operation of the electronic component, and wherein the heat sink comprises copper.

* * * * *